United States Patent [19]

Hayashi et al.

[11] Patent Number: 4,605,032

[45] Date of Patent: Aug. 12, 1986

[54] AIR VENT DEVICE FOR FUEL TANK ON VEHICLE

[75] Inventors: Mitsutoshi Hayashi, Wako; Kazunobu Nagaoka, Asaka; Michihiro Ohkawa, Shiki, all of Japan

[73] Assignee: Honda Giken Kogyo Kabushiki Kaisha, Tokyo, Japan

[21] Appl. No.: 622,599

[22] Filed: Jun. 20, 1984

[30] Foreign Application Priority Data

Jun. 22, 1983 [JP] Japan .............................. 58-112468

[51] Int. Cl.[4] .............................................. F16K 24/00
[52] U.S. Cl. ......................................... 137/44; 137/588
[58] Field of Search ............... 137/44, 588, 350, 439.1

[56] References Cited

U.S. PATENT DOCUMENTS

| 2,406,373 | 8/1946 | Heigis | 137/44 X |
| 3,967,633 | 7/1976 | Hallanger et al. | 137/44 X |
| 4,323,096 | 4/1982 | Dugge et al. | 137/588 X |

*Primary Examiner*—Henry Bennett
*Attorney, Agent, or Firm*—Armstrong, Nikaido, Marmelstein & Kubovcik

[57] ABSTRACT

An air vent device for a fuel tank on a vehicle, having paired first and second air vent pipes joined to the portions of an upper section of a fuel tank which are spaced from each other in the lateral direction of said vehicle, and a main air vent pipe connected to said paired air vent pipes to communicate the same with the atmospheric air. A connecting point of said three air vent pipes is positioned below at least one of left and right maximum-angled surfaces, which are inclined with respect to the lateral axis of said fuel tank, of a fuel contained therein. A normally-opened float valve adapted to be closed when the fuel reaches the same is provided in said first or second air vent pipe, which is on the side of said connecting point.

6 Claims, 3 Drawing Figures

AIR VENT DEVICE FOR FUEL TANK ON VEHICLE

BACKGROUND OF THE INVENTION

1. Field of the Invention

This invention relates to an air vent device for a fuel tank on a vehicle, such as an automobile, and more particularly to an air vent device for such a fuel tank, consisting of first and second air vent pipes connected to the portions of an upper section of a fuel tank which are spaced from each other in the lateral direction of the vehicle, and a main air vent pipe connected at its inner end to the first and second air vent pipes and which communicates at its outer end with the atmospheric air. Thus, even in the case where a surface of a fuel in a fuel tank is inclined to right or left with respect to the lateral axis thereof when the vehicle turns to apply a centrifugal force to the fuel or when the vehicle runs or parks on an inclined road surface, at least one of the first and second air vent pipes is not blocked from an upper space in the fuel tank so as to enable the fuel to be fed reliably from the fuel tank to an engine at all times.

2. Description of the Prior Art

In a conventional air vent device of this kind, a connecting point of first, second and main air vent pipes is positioned above two surfaces, which are inclined to right and left at a maximum angle with respect to the lateral axis of a fuel tank, of the fuel therein to keep at least one of the first and second air vent pipes communicated with an upper space in the fuel tank when the fuel surface is inclined. In such an air vent device, it is necessary that the connecting point mentioned above be set in a position which is spaced sufficiently in the upward direction from the fuel tank. This makes it necessary to reserve a space of a large height between a floor of a vehicle and the fuel tank for setting the fuel tank under the floor. Moreover, there is naturally a limit to a road clearance of the fuel tank. This results in a problem of the flattening of the fuel tank and also of a decrease in the capacity thereof.

SUMMARY OF THE INVENTION

An object of the present invention, which has been developed in view of the above-mentioned problems, is to provide an air vent device, which can be operated without trouble even when a connecting point of three air vent pipes in the device is positioned near an upper surface of a fuel tank, and which enables the fuel tank to be provided in a position close to a floor of a vehicle. In order to achieve this object, the present invention provides an air vent device characterized in that a connecting point of such three air vent pipes is positioned below at least one of two surfaces, which are inclined to the right and left at a maximum angle with respect to the lateral axis of a fuel tank, of a fuel therein, and in that a normally-opened float valve adapted to be closed when the fuel reaches the same is provided in a first or second air vent pipe which is on the side of the mentioned one inclined fuel surface.

DESCRIPTION OF THE PREFERRED EMBODIMENTS

Embodiments of the present invention will now be described with reference to the drawings.

Figure 1:
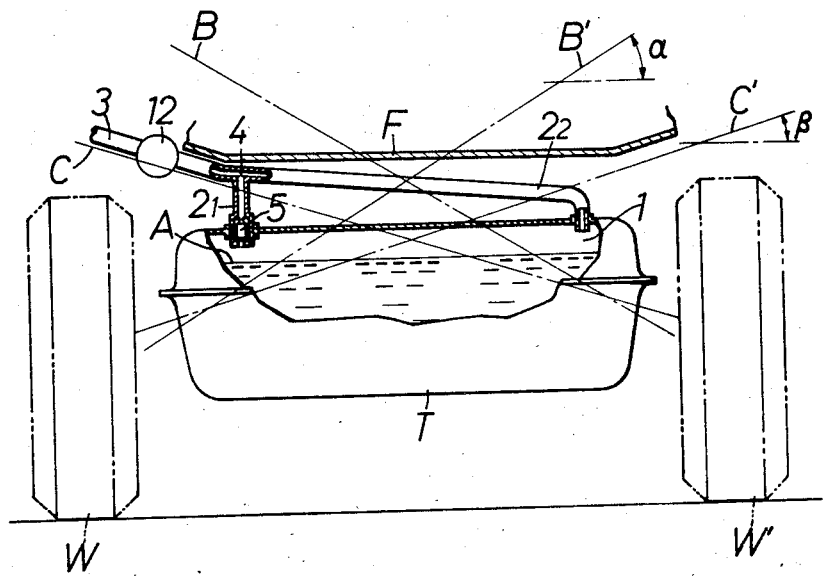
FIG. 1 is a rear elevational view of a fuel tank and its surroundings for an automobile, to which a first embodiment of the present invention is applied.

First, referring to FIG. 1 which illustrates a first embodiment of the invention, reference letter F denotes a floor plate of an automobile, and W, W' left and right wheels, a fuel tank T being provided immediately under the floor plate F.

A surface of a fuel, which is obtained when the fuel is injected into the fuel tank T up to an upper feed limit, is designated by the letter A. A space 1 for absorbing the thermal expansion of the fuel is provided above the fuel surface A. The fuel surface inclined at a maximum angle, in which the left and right portions thereof are higher than the right and left portions thereof, respectively, with respect to the lateral axis of the fuel tank T due to the influence of the centrifugal force occurring when a vehicle turns to right or left are designated by the letters B, B'. The fuel surfaces inclined with the left and right portions thereof higher than the right and left portions thereof, respectively, with respect to the lateral axis of the fuel tank T when the vehicle is stopped on a ground surface inclined to left or right at a maximum permissible angle are designated by the letters C, C'. Since an angle of inclination of the fuel surfaces B, B' is greater than an angle of the latter fuel surfaces C, C', the fuel surfaces B, B' are called maximum-angled inclined fuel surfaces.

First and second air vent pipes $2_1$, $2_2$ are joined to the portions of an upper wall of the fuel tank T which are spaced from each other sufficiently in the direction in which the left and right wheels W, W' are arranged, in such a manner that the pipes $2_1$, $2_2$ are communicated with the space 1 above the fuel surface A. These air vent pipes $2_1$, $2_2$ are connected at a connecting point 4 to each other and also to a main air vent pipe 3, which is communicated with the atmospheric air. The connecting point 4 is positioned below one of the maximum-angled inclined fuel surfaces B, B' and preferably above the inclined fuel surfaces C, C' obtainable when the vehicle is stopped in a laterally inclined place. A float valve 5 is provided in the first or second air vent pipe, which is on the side of the connecting point 4, namely, the first air vent pipe $2_1$ in the embodiment shown in the FIG. 1.

Figure 2:
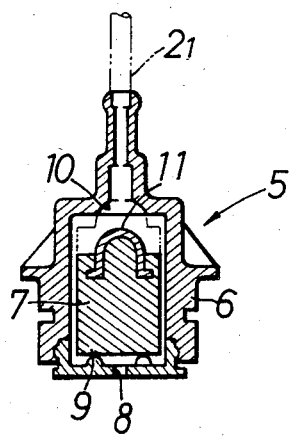
FIG. 2 is an enlarged longitudinal section of a float valve provided in the embodiment.

The float valve 5 as shown in FIG. 2 consists of a valve box 6 connected to a lower open end of the first air vent pipe $2_1$, and a float 7 fitted loosely in the valve box 6 in such a manner that the float 7 can be moved freely in the vertical direction. A bottom wall of the valve box 6 is provided with a through bore 8, and projections 9 for supporting the float 7 when it is moved downward, to prevent the through bore 8 from being closed. A valve seat 10 is formed on a top wall of the valve box 6. The float 7 is provided with a spherical valve portion 11 adapted to engage the valve seat 10 when the float 7 is moved upward. Accordingly, when the float 7 is moved downward, the first air vent pipe $2_1$ is communicated with the space 1 but, when the fuel reaches the float valve 5 to cause the float 7 to be moved upward, the first air vent pipe $2_1$ is closed. Namely, the float valve 5 is a so-called normally-opened valve.

The main air vent pipe 3 is provided with a pressure-responding two-way valve 12, which is normally closed. When the internal pressure in the fuel tank T decreases to a level lower than a predetermined range while the fuel is applied to an engine, the valve 12 is opened to introduce atmospheric air into the fuel tank T. The valve 12 also opens when the internal pressure in the fuel tank T increases to a level higher than the predetermined range due to the solar heat, to discharge the excessively increased portion of the internal pressure in the fuel tank T to the outside thereof.

The operation of this embodiment will now be described.

When the fuel in the fuel tank T keeps a substantially horizontal fuel surface A, the space 1 above the fuel surface A is communicated with the main air vent pipe 3 via the first and second air vent pipes $2_1$, $2_2$, and atmospheric air can be introduced thereinto. Accordingly, the feeding of the fuel from the fuel tank T to the engine can be accomplished without trouble.

When the lower open end of the second air vent pipe $2_2$ becomes lower than the inclined fuel surface C' while the vehicle is stopped in an inclined space, the space 1 above the fuel surface C' continues to be communicated with the main air vent pipe 3 via the float valve 5 in an opened state and first air vent pipe $2_1$. On the contrary, when the lower open end of the first air vent pipe $2_1$ becomes lower than the inclined fuel surface C, the float valve 5 is closed in response to the arrival of the fuel at the valve, so that the space 1 above the fuel surface C continues to be communicated with the main air vent pipe 3 via the second air vent pipe $2_2$. Therefore, the operation of the engine can be continued without causing troubles in the feeding of the fuel in any of the above-mentioned cases. In the case where a long period of time has elapsed after the lower open end of the first air vent pipe $2_1$ became lower than the inclined fuel surface C with the float valve 5 closed incompletely, the fuel would pass through the float valve 5. Even in such a case, the fuel which has passed through the float valve 5 does not reach the connecting point 4 since the connecting point 4 of the three air vent pipes $2_1$, $2_2$, 3 in the embodiment shown in the drawings is positioned above the inclined fuel surface C; the main air vent pipe 3 and space 1 still continue to be communicated with each other.

When the vehicle turns to cause the lower open end of the second air vent pipe $2_2$ to become lower than the maximum-angled inclined fuel surface B', the space 1 above the fuel surface B' continues to be communicated with the main air vent pipe 3 via the float valve 5 and first air vent pipe $2_1$ in the same manner as in the case where the lower open end of the second air vent pipe $2_2$ becomes lower than the inclined fuel surface C'. When the connecting point 4 becomes lower than the maximum-angled inclined fuel surface B, the float valve 5 is closed in response to the arrival of the fuel to the valve. Even when this valve is closed incompletely in such a case to cause the fuel to pass therethrough at a very low rate, the portion of the air vent pipes $2_1$, $2_2$, 3 which corresponds to the connecting point 4 is not clogged therewith while the vehicle turns, since the turning of a vehicle is generally done in a very short period of time. Therefore, the space 1 above the fuel surface B continues to be communicated with the main air vent pipe 3 via the second air vent pipe $2_2$, and no trouble occurs in the feeding of the fuel to the engine.

Figure 3:
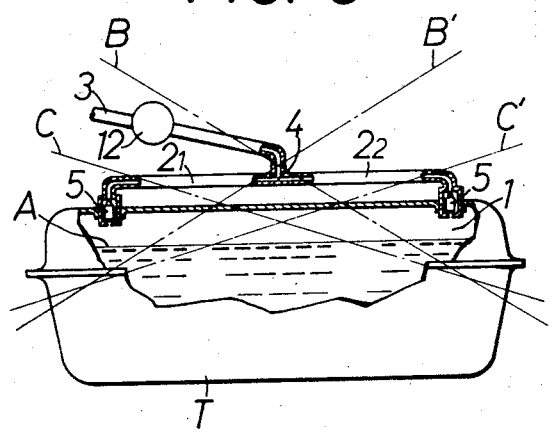
FIG. 3 is a drawing similar to FIG. 1, illustrating a fuel tank to which a second embodiment of the present invention is applied.

FIG. 3 illustrates a second embodiment of the present invention, in which float valves 5, 5 are provided in both of first and second air vent pipes $2_1$, $2_2$. This arrangement enables a connecting point 4 of three air vent pipes $2_1$, $2_2$, 3 to be positioned below left and right maximum-angled inclined fuel surfaces B, B'. Since the construction of the remaining parts of this embodiment is identical with that of the corresponding parts of the first embodiment, the former parts are designated by the same reference numerals in FIG. 3 as the latter parts.

According to the present invention described above, a normal operation of the air vent device can be secured even when the connecting point of three air vent pipes, i.e. first and second air vent pipes and main air vent pipe is positioned below at least one of the left and right maximum-angled inclined fuel surfaces in the fuel tank. Accordingly, the connecting point can be set in a position close to an upper surface of a fuel tank to reduce the distance between the fuel tank and a floor of a vehicle. This enables the capacity of the fuel tank to be increased with a predetermined minimum road clearance thereof secured. Moreover, the arrangement and construction of the air vent pipes are as simple as those of the air vent pipes in a conventional air vent device of this kind.

What is claimed is:

1. An air vent device for a fuel tank on a vehicle, having paired first and second air vent pipes joined to the portions of an upper section of a fuel tank which are spaced from each other in the lateral direction of said vehicle, and a main air vent pipe connected to said paired air vent pipes to communicate those paired pipes with the atmospheric air, wherein a connecting point of said three air vent pipes is positioned below at least one of left and right maximum-angled inclined surfaces of fuel contained in the fuel tank, which surfaces are inclined with respect to the lateral axis of said fuel tank, and wherein said maximum-angled inclined surfaces are obtainable when said vehicle turns to the left and right, and a normally-opened float valve adapted to be closed when the fuel reaches said float valve, said float valve being provided in said first or second air vent pipe, and wherein a portion of said valve opening into the tank is positioned to be submerged in the fuel when the fuel surface is inclined to be said one maximum-angled inclined surface.

2. An air vent device according to claim 1, wherein said connecting point of said three air vent pipes is positioned below both of said left and right maximum-angled inclined fuel surfaces, and said normally-opened float valve is provided in each of said first and second air vent pipes.

3. An air vent device according to claim 1, wherein said connecting point of said air vent pipes is positioned above an inclined fuel surface obtainable when said vehicle is stopped in a laterally-inclined place having a maximum permissible angle of inclination.

4. An air vent device according to claim 2, wherein said connecting point of said air vent pipes is positioned above an inclined fuel surface obtainable when said vehicle is stopped in a laterally-inclined place having a maximum permissible angle of inclination.

5. An air vent device according to claim 1, wherein said connecting point is laterally displaced toward said air vent pipe provided with said normally-opened float valve.

6. An air vent device according to claim 2, wherein said connecting point is located substantially at the lateral center above the fuel tank.

* * * * *